the present invention is achieved through controlled confinement of the rubber. It has been found that the joint of the present invention is extremely durable and is not susceptible to deterioration from excessive deformation of the type above described in connection with conventional annular bushings of the prior art type.

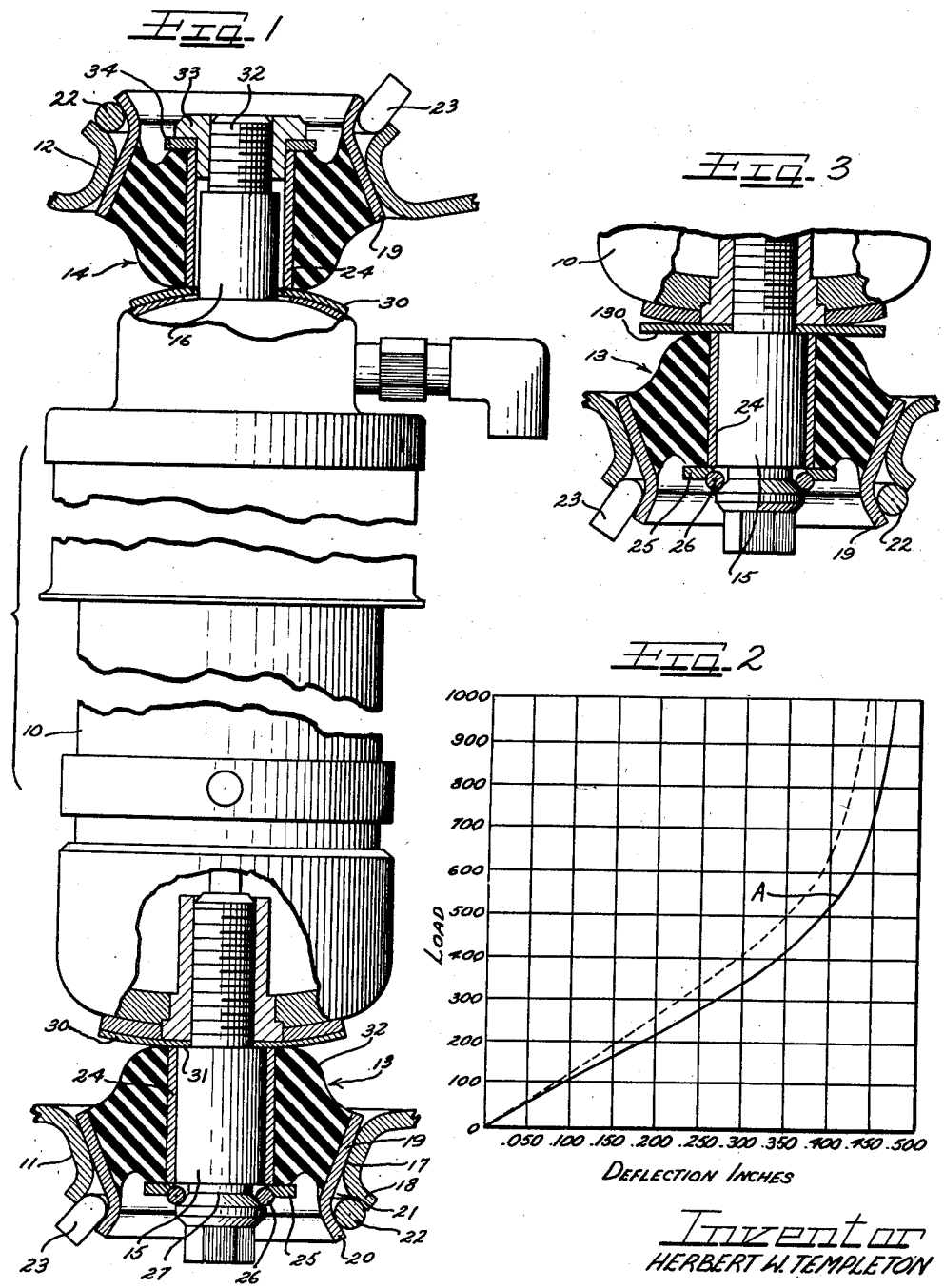

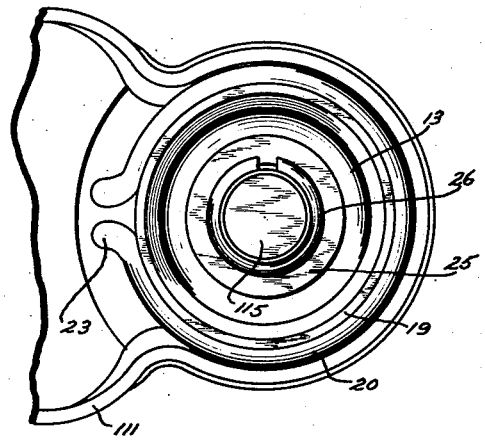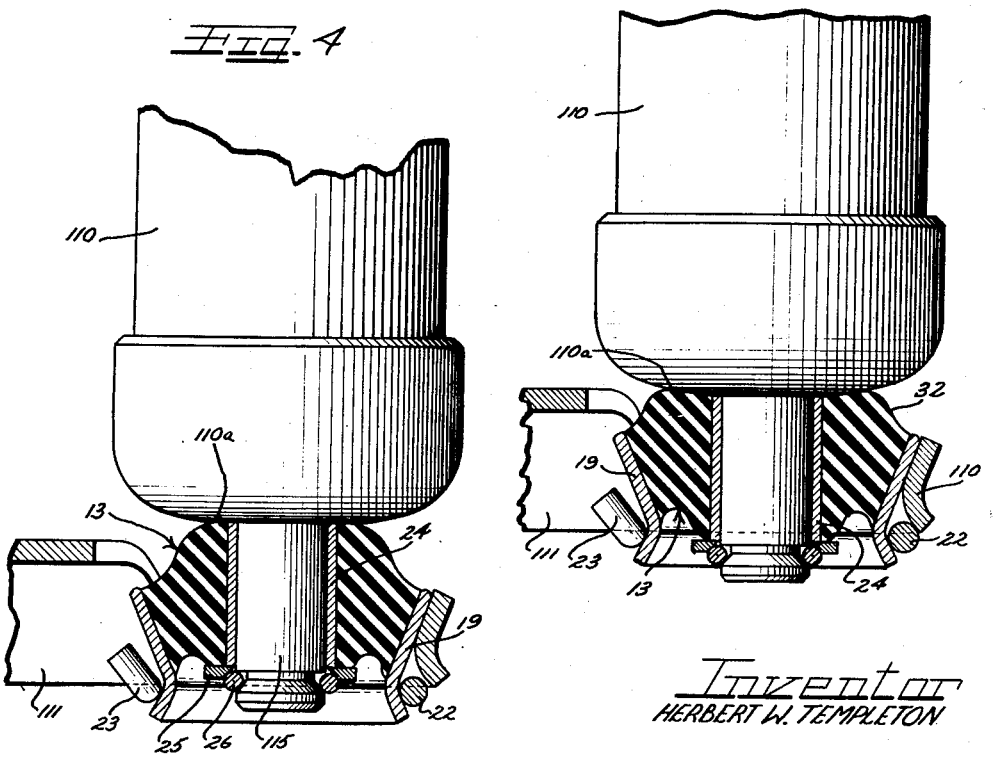

2,927,786

MOUNTING FOR VEHICLE STRUT

Herbert W. Templeton, Southfield Township, Oakland County, Mich., assignor to Thompson Ramo Wooldridge Inc., a corporation of Ohio Application May 1, 1957, Serial No. 656,363

8 Claims. (Cl. 267—8)

The present invention relates to mounting assemblies and is, more particularly, concerned with the provision of a substantially improved resilient mount for vehicular suspension struts, or the like.

In recent years the automotive industry has adopted reciprocating or airplane type shock absorbers for connection between the vehicle axle and the frame and arranged with the axis of reciprocation of the shock absorber parts in a generally vertical axis. With still more recent developments, automatic leveling systems have been provided for automotive vehicles and several forms of such leveling systems have employed reciprocating type expanding members, likewise positioned between the vehicle axle and frame. In the systems employing such reciprocating struts, either of the shock absorbing or leveling type, it has been usual to provide a rubber bushing between the opposite ends of the individual strut and a respective axle and frame. In prior constructions with which I am familiar, such resilient bushing connections comprise (1) an eye secured to each end of the reciprocating expandible strut member, an annular rubber bushing in each eye and a stud secured within each such resilient bushing and rigidly secured, in turn, to the vehicle frame or axle with the axis of each stud lying transverse to the axis of the reciprocable strut, or (2) a longitudinal stud on the strut co-operating with a pair of annular bushings placed above and below and apertured bracket on the frame.

It has been found that the application of contracting or extensing loads to a strut thus suspended provides a deflection curve or characteristic in the bushing such that the rubber of the bushing resists deflection at a more or less constant rate through its useful travel. However, loading the strut causes the annular rubber bushing to be squeezed out of contact between the stud and the eye of the strut as heavier loads are applied, with the result that as the load is increased less and less resilient material is positioned between the supporting stud and the portion of the strut eye transferring the load. In some cases of extremely heavy load, the bushing may actually be substantially displaced from between the stud and its support thereby effectively eliminating any resiliency in the further travel of the stud, and in some instances, destroying the bushing.

In accordance with the principles of the present invention, an improved strut mounting is provided in which heavy loading of the strut is permitted without displacement of the rubber from the connecting joint between the two members transferring the load. In accordance with the present invention, a substantially straight load-deflection curve is provided relative to the strut mounting insofar as the transmission of normal loads are concerned. Upon the application of loads above a normal value, the mounting of the present invention effectively stiffens providing a rapidly increasing resistance to further relative movement between the stud and the strut. At no time, however, is the resilient material of the strut mounting squeezed out from between the strut and its supporting member and instead, all of the controlled resiliency of the present mounting is achieved through controlled confinement of the rubber. It has been found that the joint of the present invention is extremely durable and is not susceptible to deterioration from excessive deformation of the type above described in connection with conventional annular bushings of the prior art type.

In accomplishing the above mentioned improved results, the present invention contemplates the provision of an annular bushing mounted for confined compression generally axially of its longitudinal axis rather than the relatively unconfined deflection of the prior art. The bushing itself is constructed with a generally frusto conical configuration having the minimum external diameter positioned at the point remote from the strut. The strut is provided with a longitudinally extending projection passing through the aperture in the annular bushing and secured thereto. Movement of the strut forces the central portion of the generally conical mass of rubber into the restricted passageway formed by the generally conical outside diameter of the bushing which is supported in a conforming frusto conical casing. The rubber of the bushing is thus compressed and confined at the same time. Since, as is well known, rubber is quite resilient when unconfined, but is substantially incompressible when confined, the controlled confinement thus achieved by the present invention is utilized to provide a mounting capable of limited resiliency with cushioned overtravel prevention.

In accordance with the present invention, further, a novel and extremely simple structure is provided for releasably mounting the support bushing relative to the frame and axle respectively of the vehicle in such a manner as to permit installation or removal of the bushing substantially more rapidly than heretofore. This improved mounting is permitted as a result of the generally frusto conical configuration of the bushing and comprises an overturned lip on the minor or smaller outside diameter portion of the bushing casing constructed or arranged to co-operate with a retaining ring of the snap type.

It is, accordingly, an object of the present invention to provide an improved resilient mounting for a vehicle strut or the like.

Another object of the present invention is to provide an axially loaded annular resilient bushing constructed to provide a load-deflection curve having a substantially constant slope in the normal operating range and a very rapidly increasing slope in the overloaded range.

Still a further object of the present invention is to provide a resilient mounting for vehicle struts or the like wherein the resilient material of the mounting is increasingly confined with increased load application and in which extrusion of the resilient material from the mounting parts upon heavy load is prevented.

Yet a further object of the present invention is to provide a simplified mounting for resilient joints, which mounting is capable of assembly and disassembly without the rotation of any threaded parts.

Still a further object of the present invention is to provide a substantially improved resilient mounting capable of providing limited universal pivotal motion while at the same time providing accurately controlled movement under loads applied longitudinally of the axis of the mounting.

Another object of the invention is to provide an improved mounting eliminating the need for transverse stud elements or the like and permitting the complete mounting of the reciprocating strut directly into opposed sheet metal surfaces.

Still other and further objects of the present invention will at once become apparent to those skilled in the art from a consideration of the attached drawings wherein several preferred forms of the invention are shown by way of illustration, and wherein:

Figure 1 is a side elevational view of a strut secured to a pair of opposed members by means of the mounting elements of the present invention;

Figure 2 is a graph illustrating the functioning of the mountings of the present invention;

Figure 3 is a side elevational view, in partial cross-section of a modified form of mounting constructed in accordance with the present invention;

Figure 4 is a further modified form of the present invention shown in side elevation and in partial section, in the unloaded condition;

Figure 5 is a side elevational view of the strut and mounting construction shown in Figure 4 upon the application of load thereto; and Figure 6 is an end elevational view looking upwardly at the structure shown in Figure 4.

As shown on the drawings:

As may be seen from a consideration of Figure 1, a generally vertically extending strut 10 is arranged for attachment to opposed members 11 and 12 by means of resilient mounting members 13 and 14 respectively. As above noted, one important use for the present invention lies in the automotive field in which strut 10 would take the form of a reciprocably collapsible shock absorber or leveling strut, the member 11 would comprise a sheet metal bracket rigidly secured to the vehicle axle or a part moving therewith, and the member 12 would comprise a stamped metal portion of the vehicle body frame. It will be understood, however, that for purposes of the present invention, the strut 10 may comprise any reciprocably expandible strut and the members 11 and 12 may likewise comprise substantially any two members to be secured together in a controlled fashion.

As shown, the strut 11 is provided with axially extending projection shaft ends 15 and 16 for co-operation with the respective mounting members 13 and 14. Considering the lower mounting of Figure 1, it will be seen that the member 11 is constructed of sheet metal and is provided with a pierced opening having a generally conically shaped internal surface 17 having an outwardly turned lip 18 at the minor, or small, diameter of the cone. The mounting element 13 likewise is provided with a generally frusto conical annular casing 19 having a turned out lip 20 at the minor diameter thereof. The conical portion of the casing 19 is, as may be seen from Figure 1, substantially longer than the conical portion 17 of the member 11 and as a result, a space 21 is provided between the lips 18 and 20. The lip 20 has a maximum outside diameter slightly less than the minimum inside diameter of the conical surface 17 and as a result, the casing 19 may be inserted through the member 11 downwardly into the position shown in Figure 1. It is retained in this position positively by means of a spring snap ring 22 having a pair of turned up ends 23 which may be grasped and expanded for insertion and removal from the space 21.

As shown, the portion of the resilient mounting 13 between the casing 19 and the stud 15 is constructed of resilient materials such as rubber. This material is bonded to the casing 19 and likewise is bonded to a metal bushing sleeve 24, which in turn is slidably mounted on the shaft or stud extension 15. The sleeve 24 is secured in position against the main body of the strut 10 by means of a washer 25 secured in position by means of a split retaining ring, of conventional construction, 26. The ring 26 co-operates with a groove 27 in the conventional, releaseable, manner.

The resilient flow of the rubber mounting 13 is controlled upon downward movement of the strut 10 relative to the member 11, by means of the conical configuration of the casing 19 and the generally segmental spherical backing plate 30 secured to the bottom face of the strut 10 by means of shoulder 31 on the shaft or stud 15. As a result of this construction, the application of a downwardly directed load on the strut 10 will cause deflection of the resilient material in the mounting 13 downwardly into the restriction formed by the conical housing 19. This will cause the upper portion 32 of the resilient material to bulge radially outwardly in contact with the curved backing plate 30.

As may be seen from a consideration of Figure 2, in the normal working range of the device, the application of load to the strut 10 will cause a generally linear deflection of the rubber material up to a point approximating point "A" on the graph, Figure 2. At this condition of load, which is constructed to be the maximum normal load range, further application of load to the strut 10 provides only a small additional deflection. This is true since the resilient material of the mounting 13 has been compressed between the backing plate 30 and the casing 19 to a point in which the resilient material is substantially confined and offers much greater resistance to deflection. In the transition from the load versus deflection curve between point "O" and point "A" on Figure 2, to the generally vertical portion representing the application of load beyond 600 lbs., a curved, rather than angular, graph line is provided. This results, in the present invention, from the application of rubber or other resilient material in the mounting in a manner which precludes extrusion or other movement of the resilient material from between the strut 10 and the member 11. At all times, the rubber or other resilient material of the member 13 is positioned between the strut 10 and the member 11 and the transition from ordinary loads to overload conditions is accordingly effectively snubbed or cushioned.

The mounting member 14 may, of course, be substantially identical to the mounting member 13 and is preferably the same. For purposes of illustration, however, the securement of the mounting 14 to the strut 10 is shown as a slight modification of the arrangement illustrated for securing the member 13 to the member 11. As may be seen from a consideration of Figure 1, the mounting member 14 comprises an outer casing 19 and an inner sleeve 24 bonded to the resilient material of the mounting. A generally segmental spherical curved backing member 30 is provided and the upper frame member 12 is pierced and deformed in substantially the same manner as the member 11 for acceptance of snap ring 22. However, the stud or shaft 16 is constructed in a somewhat different manner from the stud or shaft 15 and provides a threaded extension 32 for cooperation with an internally threaded nut 33 and washer 34. It will thus be understood that substantially any means may be employed for securing the sleeve 24 to the strut 10.

In the modified form of the invention illustrated in Figure 3, the mounting member 13 is identical to the mounting member 13 illustrated in Figure 1 and is so numbered for convenience. Likewise, the shaft or stud extension and the component securing parts are the same and are so numbered. However, instead of providing a generally segmental spherical backing plate 30, a generally flat backing plate 130 is provided. The effect of a provision of a flat backing plate 130 is to increase the slope of the load-deflection curve, thereby providing a curve form reaching a relatively steep slope at a somewhat lesser deflection. This is illustrated in the dotted line in the graph of Figure 2. It will thus be apparent that the mounting member of the present invention is capable of variation in its over-all operation in a relatively simple manner, namely, by the substitution of backing members 30, 130, having slightly different configurations.

In the embodiment of the invention illustrated in Figures 4, 5 and 6, a strut 110 is employed with a mounting member 13 secured to a shaft or stud extension 115 having an external end of substantially the same effective configuration as the stud 15 for co-operation with a retaining washer 25 and snap ring 26. The outer casing 19 of the mounting member is secured to the frame or other securing member 111 by means of a snap ring 22, which is substantially identical to the snap ring 22 shown in Figure 1, although it is shown inverted and therefore in a manner causing the outwardly directed fingers 23 to be positioned within the interior portion of the member 111.

As may readily be seen from a consideration of Figures 4 and 5, the strut 110 is employed directly as a backing plate, thereby eliminating the need for any separate backing plate 30 or 130. In such an installation, the strut 110 is designed to have the desired configuration at its end surface 110a. Although such a configuration is, of course, permanent and does not provide for the substitution of backing plates having various configurations, nevertheless, in any given vehicular installation, it is probable that the single, non-adjustable, configuration thus provided would be entirely satisfactory.

In the view illustrated in Figure 5, the mounting is shown in a loaded condition with the curved portion 32 of the resilient member 13 resiliently deflected radially outwardly. It will be apparent that continued downward movement of the stud 110 relative to the frame member 111 will cause further confinement of the resilient material between the surface 110a and the frusto-conical casing 19, thereby rapidly bringing the mounting member into the steeply sloped portion of the load-deflection curve.

It will thus be seen that I have provided a new and substantially improved mounting member providing a limited deflection under excess loads and providing a smooth transition between the normal working range and the condition of minimum deflection. The specific form of the curves illustrated in Figure 2 may, of course, be modified by a change in the resiliency of the material in the mounting as well as the shape of the more or less S curve form of the upper surface 32 thereof. Further, the included angle of the conical casing 19 may be varied. Still other and further variations may obviously be made in the structure without departing from the scope of the novel concepts of the present invention and it is, accordingly, my intention that the scope of the invention be limited solely by that of the hereinafter appended claims.

I claim as my invention:

1. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and backing surface means associated with said strut for contacting said resilient material upon movement of said strut toward said frame for forcing said material into the restricted volume of said frusto conical casing, said resilient material having a surface facing the strut backing surface means comprising a generally convex-concave S shape having its convex portion adjacent the sleeve and in closest proximity to said backing surface means, and said resilient material being unstressed when no load is applied thereto by said strut.

2. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and backing surface means associated with said strut for contacting said resilient material upon movement of said strut toward said frame for forcing said material into the restricted volume of said frusto conical casing, said backing surface being convex at the surface thereof facing said resilient material, said resilient material having a surface facing the strut backing surface means comprising a generally convex-concave S shape having its convex portion adjacent the sleeve and in closest proximity to said backing surface means, and said resilient material being unstressed when no load is applied thereto by said strut.

3. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and backing surface means associated with said strut for contacting said resilient material upon movement of said strut toward said frame for forcing said material into the restricted volume of said frusto-conical casing, said means securing said casing in said aperture comprising a radially outturned lip on the external surface of said frusto-conical casing at the minor diameter thereof and a resilient snap ring surrounding said casing between said lip and said frame for preventing movement of said casing through said frame in the direction toward said strut, said casing having a major diameter greater than the diameter of the aperture in said frame member whereby said casing is prevented from moving in either direction relative to said frame member.

4. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and backing surface means associated with said strut for contacting said resilient material upon movement of said strut toward said frame for forcing said material into the restricted volume of said frusto-conical casing, said aperture having a peripheral edge having a frusto-conical configuration conforming to the frusto-conical configuration of said casing but of shorter axial length than the length of said casing, said casing having a radially outturned lip at the end thereof remote from said strut, the minimum inside diameter of said aperture being greater than the outside diameter of said lip, and said means securing said casing in said aperture comprising a snap ring positioned between the end of said aperture remote from said strut and said radially outturned lip.

5. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and said resilient material having a gradually rounded convex surface facing said strut at the point of securement to said sleeve and in closest proximity to the strut, said surface smoothly continuing in the form of a concave surface as it extends toward the casing and away from the strut, said resilient material being unstressed in its unloaded condition and said strut having a backing surface facing the convex-concave surface of the resilient material and initially contacting the convex surface of the resilient material immediately adjacent said sleeve.

6. In combination with a strut having a longitudinally extending shaft end and an apertured frame member, a resilient mounting for securing said strut to said frame in said aperture and generally coaxially thereof, said mounting comprising an annular frusto-conical casing with its minor diameter at the end remote from the strut, means securing said casing in said aperture, a sleeve mounted on said shaft, a body of resilient material between said casing and said sleeve and bonded thereto, said resilient material and said sleeve extending longitudinally toward said strut a greater distance than said casing, and backing surface means associated with said strut for contacting said resilient material upon movement of said strut toward said frame for forcing said material into the restricted volume of said frusto-conical casing, said backing surface means comprising an integral end surface of said strut, said resilient material having a surface facing the strut backing surface means comprising a generally convex-concave S shape having its convex portion adjacent the sleeve and in closest proximity to said backing surface means, and said resilient material being unstressed when no load is applied thereto by said strut.

7. In combination, a vehicle axle supported member, a vehicle frame supporting strut and means mounting the opposite ends of said strut to said frame and said axle supported members, said strut having longitudinally extending stud members on opposite ends thereof, each of said members having an aperture therein generally coaxial with said stud in a normal position of assembly, the edge of each of said apertures being frusto-conical with a minor diameter at the end thereof facing away from said strut, an annular frusto-conical casing complementing the frusto-conical aperture in each member, means securing each said casing in its respective aperture, a sleeve mounted on each said stud and resilient material bonded to each said casing and the sleeve mounted on the stud adjacent thereto, the maximum diameter end of each of said casings being positioned a substantial distance from said strut and the resilient material extending to a position adjacent said strut for co-operation with a backing surface associated therewith.

8. In combination, a vehicle axle supported member, a vehicle frame supporting strut and means mounting the opposite ends of said strut to said frame and said axle supported members, said strut having longitudinally extending stud members on opposite ends thereof, each of said members having an aperture therein generally coaxial with said stud in a normal position of assembly, the edge of each of said apertures being frusto-conical with a minor diameter at the end thereof facing away from said strut, an annular frusto-conical casing complementing the frusto-conical aperture in each member, means securing each said casing in its respective aperture, a sleeve mounted on each said stud and resilient material bonded to each said casing and the sleeve mounted on the stud adjacent thereto, the maximum diameter end of each of said casings being positioned a substantial distance from said strut and the resilient material extending to a position adjacent said strut for co-operation with a backing surface associated therewith, said means for securing each said casing in its respective aperture comprising a radially outturned lip at the minor diameter of each casing and a snap ring surrounding said casing and positioned between said lip and a surface on said respective member on the opposite side of the respective aperture from said strut.

References Cited in the file of this patent

UNITED STATES PATENTS

| 2,478,108 | Kaemmerling | Aug. 2, 1949 |
| 2,720,374 | Hutton | Oct. 11, 1955 |
| 2,755,056 | Hutton | July 17, 1956 |

FOREIGN PATENTS

| 50,318 | France | Dec. 1, 1939 |
| | (First Addition to No. 841,602) | |
| 732,256 | Great Britain | June 22, 1955 |